(12) United States Patent
Miller et al.

(10) Patent No.: US 10,654,337 B2
(45) Date of Patent: May 19, 2020

(54) METHODS AND SYSTEMS FOR AUTOMATIC CONTROL OF AN ACCESSORY POWERED BY AN AUXILIARY POWER UNIT

(71) Applicant: THERMO KING CORPORATION, Minneapolis, MN (US)

(72) Inventors: Dean Miller, Eden Prairie, MN (US); Mark D. Leasure, Eagan, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 15/386,428

(22) Filed: Dec. 21, 2016

(65) Prior Publication Data

US 2018/0170398 A1      Jun. 21, 2018

(51) Int. Cl.
| | | |
|---|---|---|
| *B60H 1/00* | (2006.01) | |
| *B60Q 3/80* | (2017.01) | |
| *B60K 25/00* | (2006.01) | |
| *B60K 25/02* | (2006.01) | |

(52) U.S. Cl.
CPC ..... *B60H 1/00828* (2013.01); *B60H 1/00378* (2013.01); *B60H 1/00428* (2013.01); *B60H 1/00778* (2013.01); *B60K 25/00* (2013.01); *B60Q 3/80* (2017.02); *B60K 2025/022* (2013.01)

(58) Field of Classification Search
CPC ............ B60W 50/0098; B60H 1/00828; B60J 3/0304; B60Q 3/0293
USPC .......................................................... 701/36
See application file for complete search history.

(56) References Cited

U.S. PATENT DOCUMENTS

| | | | |
|---|---|---|---|
| 4,874,938 | A | 10/1989 | Chuang |
| 5,154,223 | A | 10/1992 | Ishimaru et al. |
| 5,162,020 | A | 11/1992 | Asano et al. |
| 5,231,849 | A | 8/1993 | Rosenblatt |

(Continued)

FOREIGN PATENT DOCUMENTS

| | | |
|---|---|---|
| EP | 3343728 | 7/2018 |
| WO | 2017/172484 | 10/2017 |

(Continued)

OTHER PUBLICATIONS

"DOE Program on Parasitic Energy Loss Reduction for Class 7/8 Trucks"; Heavy Vehicle Systems Optimization, Caterpillar, Apr. 19, 2006, 20 pages.

(Continued)

*Primary Examiner* — Thomas G Black
*Assistant Examiner* — Luat T Huynh
(74) *Attorney, Agent, or Firm* — Hamre, Schumann, Mueller & Larson, P.C.

(57) ABSTRACT

Methods and systems for controlling an accessory powered by an auxiliary power unit of a vehicle are provided. The method includes a control module determining when a primary power source of a vehicle is deactivated. The method also includes the control module determining when an auxiliary power unit is activated after deactivation of the primary power source. Also, the method includes the control module automatically controlling the accessory powered by the auxiliary power unit when the control module determines that the primary power source is deactivated and the auxiliary power unit is activated.

19 Claims, 4 Drawing Sheets

(56) References Cited

U.S. PATENT DOCUMENTS

| | | | |
|---|---|---|---|
| 5,333,678 A * | 8/1994 | Mellum | B60H 1/00378 122/26 |
| 5,896,910 A | 4/1999 | Chen | |
| 5,947,544 A | 9/1999 | Hubeshi | |
| 6,272,873 B1 * | 8/2001 | Bass | B60H 1/00428 62/238.3 |
| 6,407,365 B1 * | 6/2002 | De Prete, III | B60J 1/2011 160/370.21 |
| 6,536,207 B1 | 3/2003 | Kamen et al. | |
| 6,644,559 B2 | 11/2003 | Kondo et al. | |
| 6,774,636 B2 | 8/2004 | Guiheen et al. | |
| 6,811,201 B2 | 11/2004 | Naik | |
| 7,145,788 B2 | 12/2006 | Plummer | |
| 7,259,469 B2 * | 8/2007 | Brummett | B60H 1/3226 165/202 |
| 8,295,950 B1 | 10/2012 | Wordsworth et al. | |
| 8,798,857 B2 | 8/2014 | Waldschmidt et al. | |
| 8,876,013 B2 | 11/2014 | Amundson et al. | |
| 9,045,018 B2 * | 6/2015 | Swanson | B60H 1/00378 |
| 9,211,881 B2 | 12/2015 | Waldschmidt et al. | |
| 9,582,009 B2 | 2/2017 | Shahapurka et al. | |
| 2004/0169374 A1 * | 9/2004 | Wurtele | B60H 1/00378 290/1 A |
| 2009/0229288 A1 | 9/2009 | Alston et al. | |
| 2009/0233759 A1 | 9/2009 | Sheidler et al. | |
| 2016/0202325 A1 | 7/2016 | Tang | |
| 2017/0096048 A1 * | 4/2017 | Larson | B60H 1/3208 |

FOREIGN PATENT DOCUMENTS

| | | |
|---|---|---|
| WO | 2018/204591 | 11/2018 |
| WO | 2018/226389 | 12/2018 |
| WO | 2018/226649 | 12/2018 |
| WO | 2018/226848 | 12/2018 |
| WO | 2018/226857 | 12/2018 |
| WO | 2018/226862 | 12/2018 |
| WO | 2018/226906 | 12/2018 |
| WO | 2018/226986 | 12/2018 |

OTHER PUBLICATIONS

"Long-Haul Truck Idling Burns Up Profits"; Energy Efficiency & Renewal Energy, U.S. Department of Energy, 2015, 4 pages.

U.S. Appl. No. 15/857,235, filed Dec. 28, 2017 (47 pages).

* cited by examiner

METHODS AND SYSTEMS FOR AUTOMATIC CONTROL OF AN ACCESSORY POWERED BY AN AUXILIARY POWER UNIT

FIELD

This disclosure relates to an auxiliary power unit (APU) of a vehicle. More particularly, this disclosure is directed to methods and systems for automatic control of an accessory powered by the APU.

BACKGROUND

Large tractors or trucks (e.g., semi-tractors) are commonly used to transport cargo within a trailer or container. Existing tractors in a tractor-trailer combination typically include a sleeper cabin for the occupant (e.g., driver or passenger) to rest during a journey. Auxiliary power units (APUs) are used with semi-tractors to provide power to the sleeper cabin when the primary power source (e.g., tractor engine, high voltage battery source, etc.) is turned off (i.e., deactivated). This can reduce fuel consumption, maintenance costs, emissions, and noise generated by not requiring the tractor main power source to operate (e.g., idle when the main power source is a tractor engine) during occupant rest periods or other periods of vehicle non-movement.

SUMMARY

This disclosure relates generally to an auxiliary power unit (APU) of a vehicle. More specifically, this disclosure relates to methods and systems for automatic control of an accessory powered by the AP.

The embodiments described herein can provide efficient use of the APU by regulating power provided by the APU to one or more accessories powered by the APU.

In one embodiment, a method for controlling an accessory powered by an auxiliary power unit of a vehicle. The method includes a control module determining when a primary power source of a vehicle is deactivated. The method also includes the control module determining when an auxiliary power unit is activated after deactivation of the primary power source. Also, the method includes the control module automatically controlling the accessory powered by the auxiliary power unit when the control module determines that the primary power source is deactivated and the auxiliary power unit is activated.

In another embodiment, a system for controlling an accessory of a vehicle powered by an auxiliary power unit of the vehicle is provided. The system includes a primary power source, an APU and a control module. The primary power source provides power for operating the vehicle and for operating an accessory of the vehicle. The APU provides power for operating an accessory of the vehicle. The control module determines when the primary power source of the vehicle is deactivated, determines when the auxiliary power unit is activated after the primary power source is deactivated, and automatically controls the accessory powered by the auxiliary power unit when the control module determines that the primary power source is deactivated and the auxiliary power unit is activated.

BRIEF DESCRIPTION OF THE DRAWINGS

References are made to the accompanying drawings that form a part of this disclosure, and which illustrate the embodiments in which the systems and methods described in the Specification can be practiced. Like references numbers represent like parts throughout.

DETAILED DESCRIPTION

This disclosure relates generally to methods and systems for automatic control of an accessory powered by the APU.

The embodiments described herein can provide efficient use of the APU by regulating power provided by the APU to one or more accessories powered by the APU.

Figure 1:
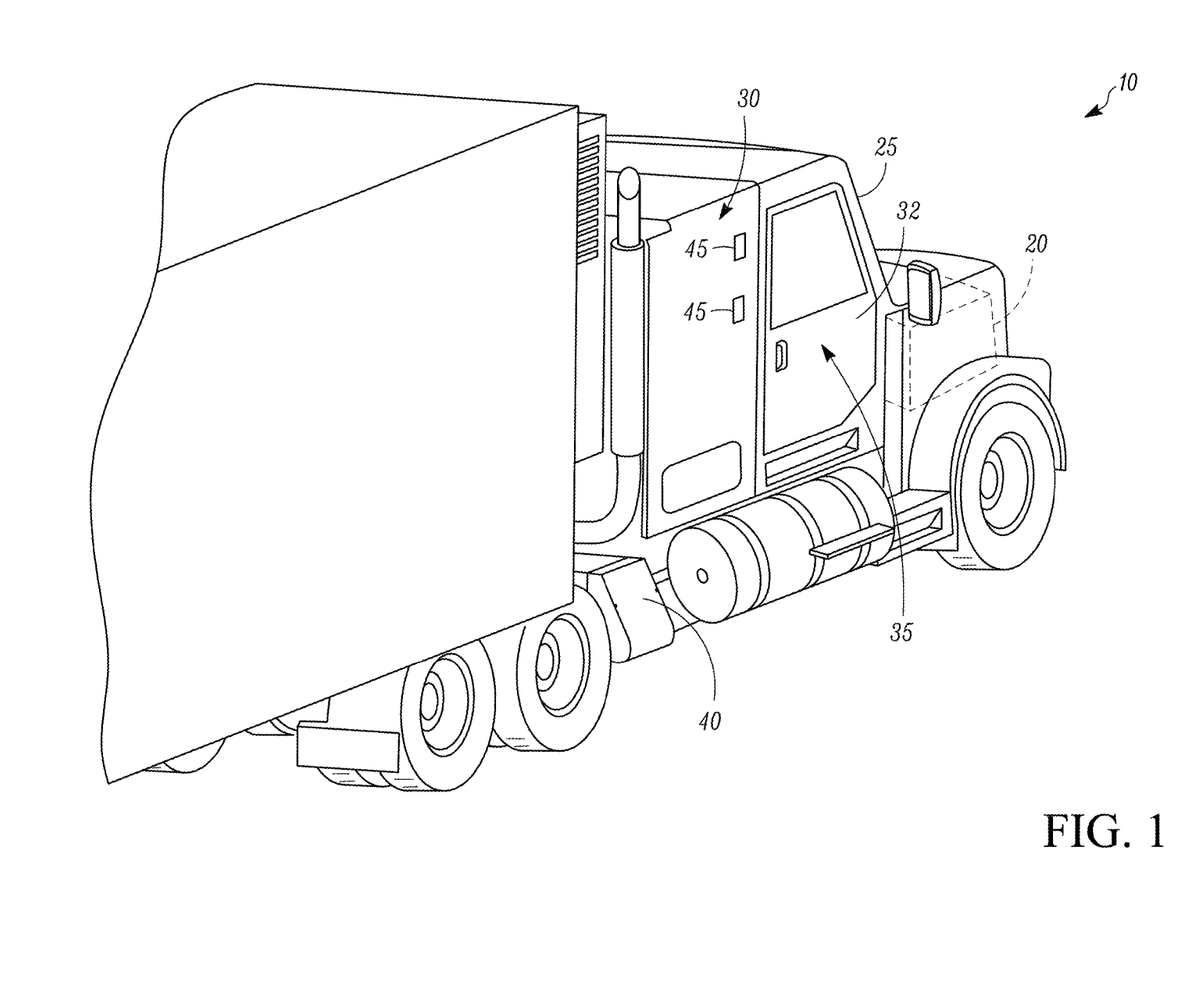
FIG. 1 illustrates a perspective view of a vehicle with an APU, according to one embodiment.

FIG. 1 illustrates a vehicle 10 according to one embodiment. The vehicle 10 is a semi-tractor or other similar vehicle (e.g., straight truck, van, etc.) that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination.

The vehicle 10 includes a primary power source 20, a cabin 25 defining a sleeping portion 30 and a driving portion 35, an APU 40, and a plurality of vehicle accessories 45 (e.g., electronic communication devices, cabin lights, a secondary HVAC system, secondary HVAC fan(s), sunshade(s) for a window/windshield of the vehicle 10, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, sunshade(s) for a window/windshield of the vehicle 10, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessories 45 and cabin accessories. The primary power source 20 can also provide power to the primary HVAC system and the secondary HVAC system. In some embodiments, the primary power source can be a prime mover such as, for example, a diesel engine.

The APU 40 is a secondary power unit for the vehicle 10 when the primary power source 20 is unavailable. When, for example, the primary power source 20 is unavailable, the APU 40 can be configured to provide power to one or more of the vehicle accessories, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10.

Figure 2:
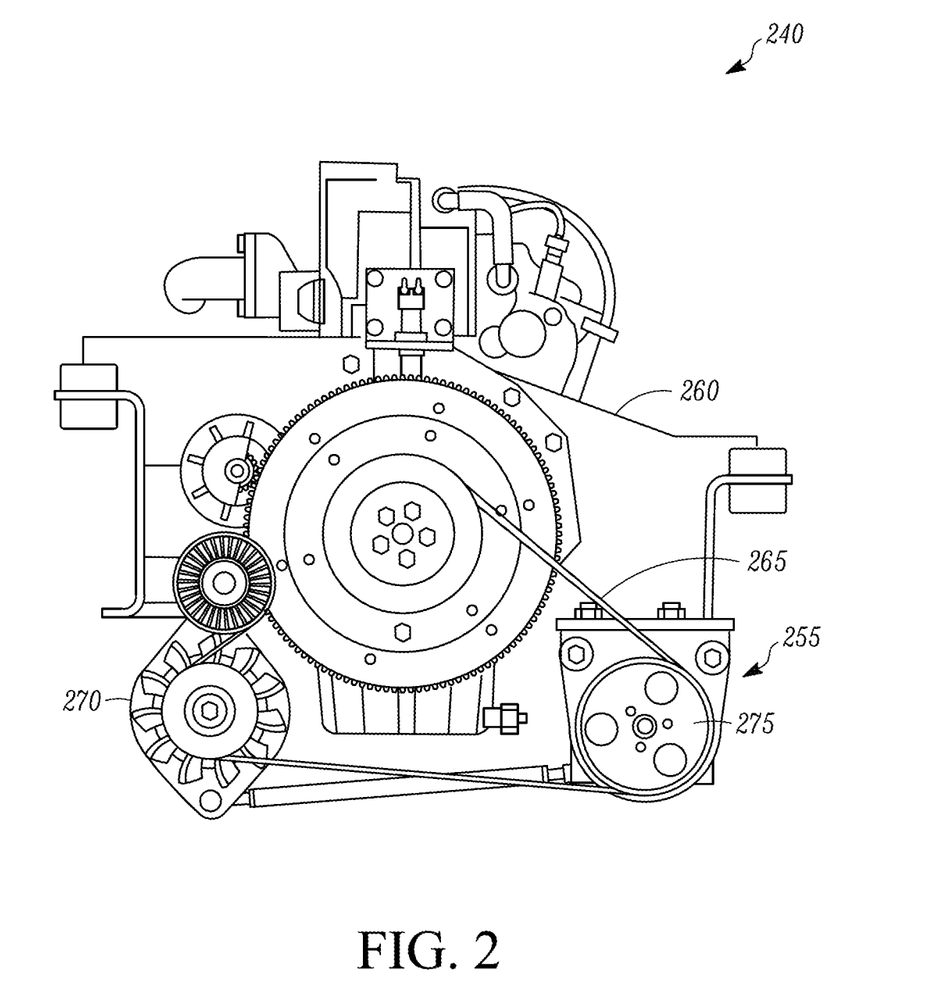
FIG. 2 illustrates a front view of an APU, according to one embodiment.

FIG. 2 illustrates a prime mover powered APU 240 that can be used with a vehicle (e.g., the vehicle 10 shown in FIG. 1), according to one embodiment. The APU 240 includes a secondary prime mover 260 coupled to a belt 265 to drive an alternator 270 and a compressor 275 of a secondary HVAC system 255. The secondary prime mover 260 is separate from a primary power source of a vehicle (e.g., the primary power source 20 of the vehicle 10 shown in FIG. 1). In some embodiments, the secondary prime mover 260 can be a diesel engine. The alternator 270 can provide power generated by the APU 240 to one or more vehicle accessories, cabin accessories, and a primary HVAC system. The secondary HVAC system 255 can provide conditioned air to a sleeping portion of a vehicle cabin (e.g., the sleeping portion 30 of the cabin 25 shown in FIG. 1). In some embodiments, the APU 240 can be turned on or off by an occupant (e.g., driver or passenger) of the vehicle. For example, the occupant can turn on the prime mover 260 of the APU 240 to generate power when a primary power source of the vehicle is turned off.

Figure 3:
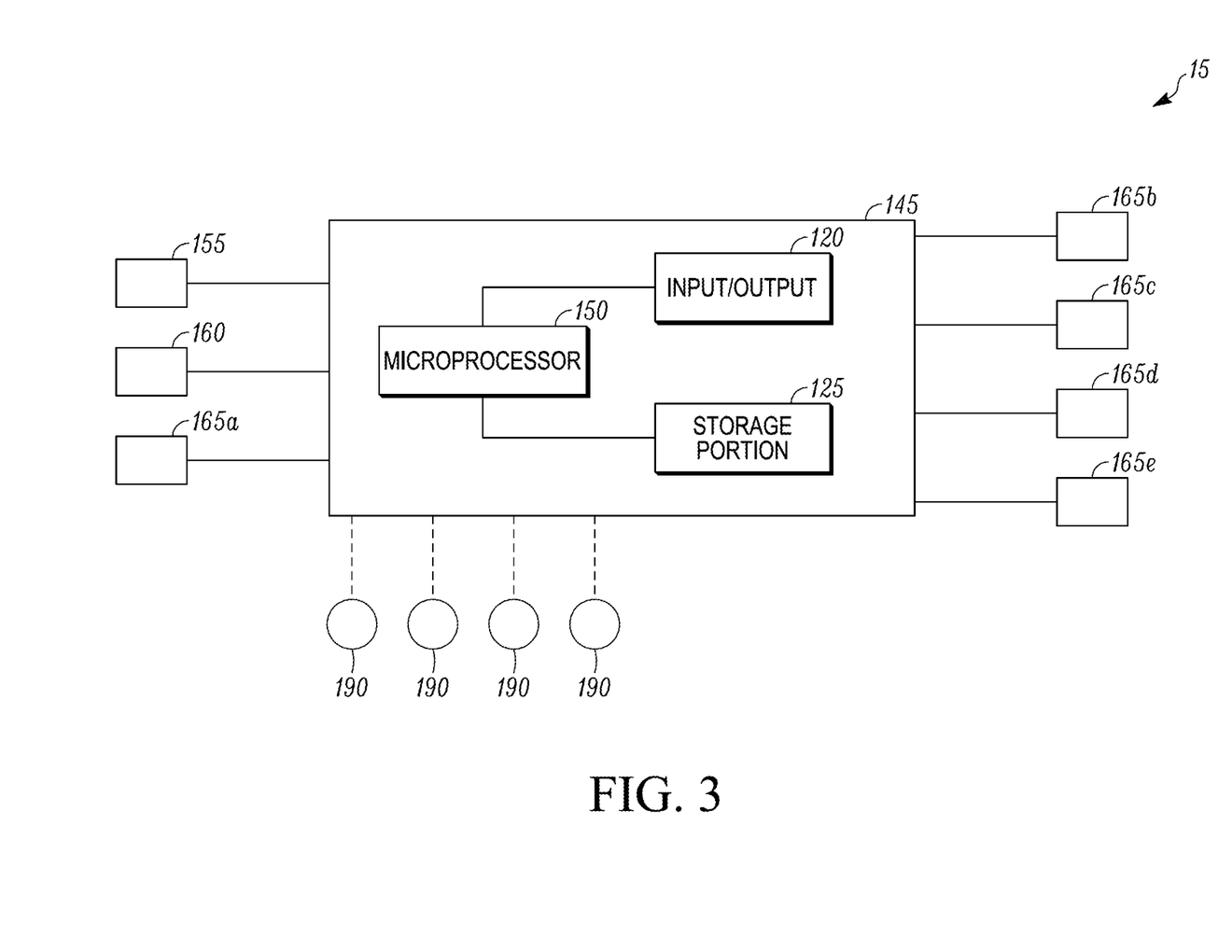
FIG. 3 illustrates a schematic view of a control system for use with the APU, according to one embodiment.

FIG. 3 illustrates a schematic of one embodiment of an accessory control system 15 for use with the APU 40 shown in FIG. 1. The accessory control system 15 includes a control module 145, a plurality of sensors 155, 160, 165, and a plurality of accessories 190. The plurality of sensors 155, 160, 165 can communicate signals indicative of parameters of the vehicle 10 to the microprocessor 150. The parameters can include measurable factors and conditions (e.g., cabin temperature, fan speed, cabin light(s) status, door(s) status, accessory status, on/off state of the primary power source 20, on/off state of the APU 40, etc.) of the vehicle 10 and/or the cabin 25.

The control module 145 includes a microprocessor 150, an input/output operator 120 and a storage portion 125 (e.g., EPROM, EEPROM, etc.). The control module 145 facilitates control of the accessory control system 15 as a central control unit. The control module 145 is configured to monitor one or more primary power source parameters, one or more cabin parameters, and one or more APU parameters. The control module 145 is also configured to activate and/or manage the APU 40 and/or one or more of the accessories 190 when the primary power source 20 is shutdown. The control module 145 can activate and manage the APU 40 automatically or can be activated and managed by an occupant (e.g., driver or passenger) using the input/output operator 120. One or more of the accessories 190 can be activated and/or managed automatically by the control module 145. One or more of the accessories 190 can also be activated and/or managed manually by an occupant of the vehicle 10. The storage portion 125 can provide storage of data related to the accessory control system 15. Alternative constructions of the control module 145 may include additional components to facilitate control and storage of data within the accessory control system 15.

The plurality of sensors 155, 160 and 165 includes a primary power source sensor 155, an APU sensor 160, and a plurality of accessory sensors 165. Additional sensors may also be incorporated in the accessory control system 15. The primary power source sensor 155 is in communication with the primary power source 20 and is configured to deliver a signal to the microprocessor 150 indicative of whether the primary power source 20 is on or off. For example, if the primary power source 20 is a prime mover (e.g., diesel engine), the primary power source sensor 155 can be configured to deliver a signal to the microprocessor 150 indicating that ignition of the primary power source 20 is turned on or turned off.

The APU sensor 160 is in communication with the auxiliary power unit 40 and is configured to deliver a signal to the microprocessor 150 indicative of whether the APU 40 is turned on or off.

The plurality of accessory sensors 165 includes: a cabin temperature sensor 165a that monitors a temperature within the cabin 25; a fan speed sensor 165b that monitors the fan speed of the secondary HVAC system, one or more door status sensor 165c that monitors whether one or more of the doors (e.g., a driver side door, the passenger door 32, etc.) of the vehicle 10 has been opened and/or closed; one or more cabin light status sensors 165d that monitors whether one or more lights within the cabin 25 are on or off; one or more accessory status sensors 165e that monitors the operating status of an accessory (e.g., sunshade(s) for a window/windshield of the vehicle 10, a refrigerator, a television, a video game console, a microwave, device charging station(s), a continuous positive airway pressure (CPAP) machine, a coffee maker, a secondary HVAC system, fan(s) of a secondary HVAC system, etc.) within the cabin 25. It will be appreciated that other accessory status sensors 165e can be implemented for monitoring the operating status of a cabin and/or vehicle accessory in the embodiments described herein.

The plurality of accessories 190 that can be automatically controlled by the control module 145 can be cabin or vehicle accessories. In some embodiments, the plurality of accessories 190 can include a vehicle accessory such as a secondary HVAC system, fan(s) of the secondary HVAC system, cabin light(s), sunshade(s) for a window/windshield of the vehicle 10, etc. In some embodiments, the plurality of accessories 190 can include a cabin accessory such as a refrigerator, a television, a video game console, a microwave, device charging station(s), a CPAP machine, a coffee maker, etc. It will be appreciated that other vehicle or cabin accessories can be automatically controlled based on the embodiments described herein.

Figure 4:
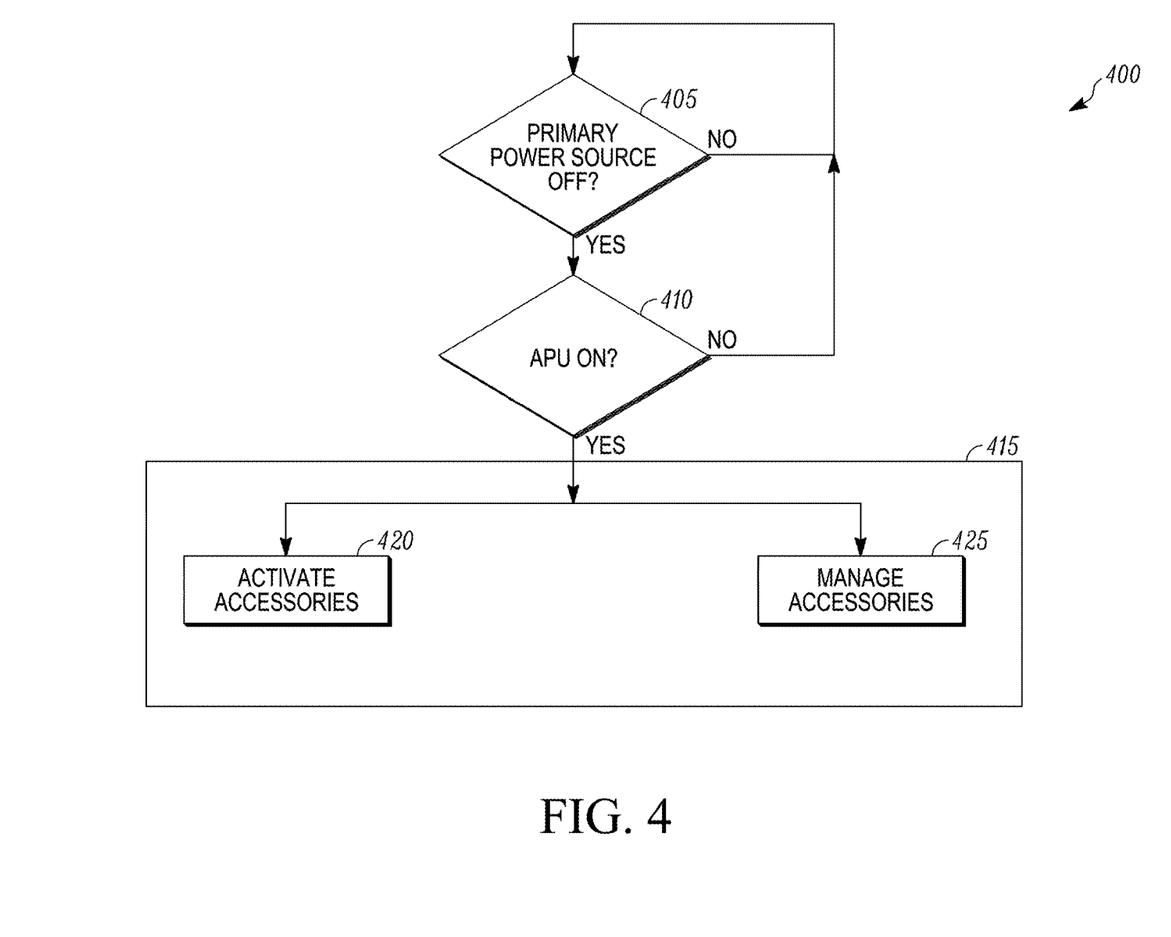
FIG. 4 illustrates a flow chart of a method for automatic control of an accessory powered by an APU, according to one embodiment.

FIG. 4 illustrates a flowchart of a method 400 for automatic control of an accessory powered by the APU using the accessory control system 15, according to one embodiment. At 405, the control module 145 determines whether the primary power source 20 is turned off In some embodiments, the control module 145 determines whether primary power source 20 is turned off based on a signal sent to the control module 145 from the primary power source sensor 155. For example, when the primary power source 20 is an engine, the primary power source sensor 155 can send a signal to the control module 145 indicating whether the ignition of the engine has been turned off. When the control module 145 determines that the primary power source 20 is turned off, then the method 400 proceeds to 410. When the control module 145 determines that the primary power source 20 is not turned off, then the method 400 returns to 405.

At 410, the control module 145 determines whether APU 40 is turned on. In some embodiments, the control module 145 determines whether APU 40 is turned on based on a signal sent to the control module 145 from the APU sensor 160. For example, when an occupant (e.g., driver or passenger) of the vehicle 10 turns on the APU 40 using the input/output operator 120, the APU sensor 160 can send a signal to the control module 145 indicating that the APU 40 has received an instruction to turn on. When the control module 145 determines that the APU 40 is turned on, then the method 400 proceeds to 415. When the control module 145 determines that the APU 40 is not turned on, then the method 400 returns to 405.

At 415, the control module 145 automatically controls one or more vehicle accessories 45 and/or one or more cabin accessories of the vehicle 10 in order to provide efficient use of the APU 40. In the embodiment shown in FIG. 4, this includes the control module 145 automatically activating one or more vehicle accessories 45 and/or one or more cabin accessories of the vehicle 10 at 420. This also includes the control module 145 automatically managing one or more vehicle accessories 45 and/or one or more cabin accessories of the vehicle 10 at 425.

In one example at 420, during the day the control module 145 can automatically activate sunshade(s) of the vehicle 10 to block sun light and heat from entering the cabin 25 via any windows and the windshield of the vehicle 10. By blocking sun heat from entering the cabin 25, the secondary HVAC system can provide conditioned air within the sleeping portion 30 more efficiently and thereby reduce the amount of power required by the APU 40 and increase the operational runtime of the APU 40

In one example at 425, the control module 145 can automatically adjust a fan speed of fan(s) of the secondary HVAC system based on a temperature within the cabin 25 monitored by the cabin temperature sensor 165a and a current fan speed monitored by the fan speed sensor 165b. For example, when the control module 145 determines from the cabin temperature sensor 164a that the temperature within the cabin 25 is sufficiently close (e.g., within ~5° F.) to a predefined cabin temperature setpoint (e.g., set by the driver or passenger of the vehicle) and the fan speed of the fan(s) of the secondary HVAC system are set to a high speed, the control module 145 can automatically reduce the fan speed of the fan(s) of the secondary HVAC system to reduce the amount of power supplied by the APU 40 to the fan(s) of the secondary HVAC system. Accordingly, the control module 145 can increase the efficiency of power supplied by the APU 40 and thereby increase the operational runtime of the APU 40.

In another example at 425, the control module 145 can automatically adjust the fan speed of the secondary HVAC system based on door status data received from the door status sensor(s) 164c indicating whether one or more doors of the vehicle 10 are opened or closed and based on and a current fan speed monitored by the fan speed sensor 165b. For example, if the control module 145 determines from the door status sensor(s) 164c that one of the doors of the vehicle 10 is open, the control module 145 can automatically reduce the fan speed of the secondary HVAC system. This can allow the secondary HVAC system to operate more efficiently and thereby reduce the amount of power required by the APU. Once the control module 145 determines that the door that was opened is now closed, the control module 145 can automatically increase the fan speed of the secondary HVAC system back to its previous condition. Accordingly, the control module 145 can increase the efficiency of power supplied by the APU 40 and thereby increase the operational runtime of the APU 40.

In another example at 425, the control module 145 can automatically switch on or off cabin light(s) based on the operating status of one or more accessory status sensors 165e and based on whether the cabin light(s) are on or off using data from one or more light status sensors 165d. In one instance, the control module 145 can automatically switch off cabin light(s) within the cabin 25 when it is determined that the occupant (e.g., driver or passenger) is likely asleep based on one or more of the accessory status sensors 165e indicating that an accessory (e.g., a television, etc.) is off and/or an accessory (e.g., CPAP machine) is on. Accordingly, the control module 145 can increase the efficiency of power supplied by the APU 40 and thereby increase the operational runtime of the APU 40.

In another example at 425, the control module 145 can automatically manage the amount of power directed from the APU 40 to one or more accessories based on the operating status of one or more accessory status sensors 165e. In one instance, the control module 145 can automatically reduce the amount of power directed from the APU 40 to an accessory that includes a parasitic load (e.g., a refrigerator, a television, charging device(s), a coffee maker, etc.) when it is determined from one or more of the accessory status sensors 165e that the accessory with the parasitic load is off or otherwise not currently operating. Accordingly, the control module 145 can increase the efficiency of power supplied by the APU 40 and thereby increase the operational runtime of the APU 40.

Although a number of methods and systems are described herein, it is contemplated that a single system or method can include more than one of the above discussed subject matter. Accordingly, multiple of the above systems and methods can be used together in a single system or method.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

Aspects:

It is appreciated that any of aspects 1-8 and 9-16 can be combined.

1. A method for controlling an accessory powered by an auxiliary power unit of a vehicle, the method comprising:
a control module determining when a primary power source of a vehicle is deactivated;
the control module determining when an auxiliary power unit is activated after deactivation of the primary power source;
the control module automatically controlling the accessory powered by the auxiliary power unit when the control module determines that the primary power source is deactivated and the auxiliary power unit is activated.

2. The method of aspect 1, wherein the accessory is a sunshade of the vehicle, and
wherein the control module automatically controlling the accessory powered by the auxiliary power unit includes automatically activating the sunshade of the vehicle to block sun light and heat from entering a cabin of the vehicle.

3. The method of any one of aspects 1 and 2, wherein the accessory is a secondary HVAC system of the vehicle, and
wherein the control module automatically adjusts a fan speed of the secondary HVAC system when a current temperature of a cabin of the vehicle is sufficiently close to a predefined cabin temperature setpoint.

4. The method of aspect 3, wherein the control module automatically reduces the fan speed of the secondary HVAC system when the current temperature of the cabin of the vehicle is sufficiently close to the predefined cabin temperature setpoint.

5. The method of any one of aspects 1-4, wherein the accessory is a secondary HVAC system of the vehicle, and wherein the control module automatically adjusts a fan speed of the secondary HVAC system based on a door status of a door of the vehicle.

6. The method of aspect 5, wherein the control module automatically reduces the fan speed of the secondary HVAC system when the door of the vehicle is opened.

7. The method of any one of aspects 1-6, wherein the accessory is a cabin light of the vehicle, and wherein the control module automatically turns off the cabin light based on an operating status of a second accessory that indicates that an occupant of the vehicle is asleep.

8. A system for controlling an accessory of a vehicle powered by an auxiliary power unit of the vehicle, the system comprising:

a primary power source providing power for operating the vehicle and for operating the accessory of the vehicle;

an auxiliary power unit providing power for operating the accessory of the vehicle;

a control module that determines when the primary power source of a vehicle is deactivated, determines when the auxiliary power unit is activated after the primary power source is deactivated, and automatically controls the accessory powered by the auxiliary power unit when the control module determines that the primary power source is deactivated and the auxiliary power unit is activated.

9. The system of aspect 8, wherein the accessory is a sunshade of the vehicle, and wherein the control module automatically activates the sunshade of the vehicle to block sun light and heat from entering a cabin of the vehicle.

10. The system of any one of aspects 8 and 9, wherein the accessory is a secondary HVAC system of the vehicle, and wherein the control module automatically adjusts a fan speed of the secondary HVAC system when a current temperature of a cabin of the vehicle is sufficiently close to a predefined cabin temperature setpoint.

11. The system of aspect 10, wherein the control module automatically reduces a fan speed of the secondary HVAC system when a current temperature of the cabin of the vehicle is sufficiently close to the predefined cabin temperature setpoint.

12. The system of any one of aspects 8-11, wherein the accessory is a secondary HVAC system of the vehicle, and wherein the control module automatically adjusts a fan speed of the secondary HVAC system based on a door status of a door of the vehicle.

13. The system of aspect 12, wherein the control module automatically reduces the fan speed of the secondary HVAC system when the door of the vehicle is opened.

14. The system of any one of aspects 8-13, wherein the accessory is a cabin light of the vehicle, and wherein the control module automatically turns off the cabin light based on an operating status of a second accessory that indicates that an occupant of the vehicle is asleep.

15. The system of any one of aspects 8-14, wherein the auxiliary power unit is an electrically powered auxiliary power unit.

16. The system of any one of aspects 8-14, wherein the auxiliary power unit is a prime mover powered auxiliary power unit.

What is claimed is:

1. A method for controlling an accessory powered by an auxiliary power unit of a vehicle, the method comprising:

a control module determining when a primary power source of a vehicle is deactivated;

the control module determining when an auxiliary power unit is activated after deactivation of the primary power source;

the control module automatically controlling the accessory powered by the auxiliary power unit when the control module determines that the primary power source is deactivated and the auxiliary power unit is activated, wherein the accessory is at least one of a cabin accessory and a vehicle accessory located within a cabin of the vehicle, and wherein the control module automatically controlling the accessory powered by the auxiliary power unit includes at least one of automatically activating the accessory and automatically managing the accessory.

2. The method of claim 1, wherein the accessory is a sunshade of the vehicle, and wherein the control module automatically controlling the accessory powered by the auxiliary power unit includes automatically activating the sunshade of the vehicle to block sun light and heat from entering a cabin of the vehicle.

3. The method of claim 1, wherein the accessory is a secondary HVAC system of the vehicle, and wherein the control module automatically adjusts a fan speed of the secondary HVAC system when a current temperature of a cabin of the vehicle is sufficiently close to a predefined cabin temperature setpoint.

4. The method of claim 3, wherein the control module automatically reduces the fan speed of the secondary HVAC system when the current temperature of the cabin of the vehicle is sufficiently close to the predefined cabin temperature setpoint.

5. The method of claim 1, wherein the accessory is a secondary HVAC system of the vehicle, and wherein the control module automatically adjusts a fan speed of the secondary HVAC system based on a door status of a door of the vehicle.

6. The method of claim 5, wherein the control module automatically reduces the fan speed of the secondary HVAC system when the door of the vehicle is opened.

7. The method of claim 1, wherein the accessory is a cabin light of the vehicle, and wherein the control module automatically turns off the cabin light based on an operating status of a second accessory that indicates that an occupant of the vehicle is asleep.

8. The method of claim 1, wherein the vehicle accessory is one of a secondary heating, ventilation and air conditioning (HVAC) system, a fan of the secondary HVAC system, a cabin light, a sunshade for a window/windshield of the vehicle, and wherein the cabin accessory is one of a refrigerator, a television, a video game console, a microwave, a device charging station, a continuous positive airway pressure (CPAP) machine, and a coffee maker.

9. A system for controlling an accessory of a vehicle powered by an auxiliary power unit of the vehicle, the system comprising:

a primary power source providing power for operating the vehicle and for operating the accessory of the vehicle;

an auxiliary power unit providing power for operating the accessory of the vehicle;

a control module that determines when the primary power source of a vehicle is deactivated, determines when the auxiliary power unit is activated after the primary power source is deactivated, and automatically controls the accessory powered by the auxiliary power unit when the control module determines that the primary power source is deactivated and the auxiliary power unit is activated, wherein the accessory is at least one of a cabin accessory and a vehicle accessory located within a cabin of the vehicle, and wherein the control module automatically controls the accessory powered by the auxiliary power unit includes the control module at least one of automatically activating the accessory and automatically managing the accessory.

10. The system of claim 9, wherein the accessory is a secondary HVAC system of the vehicle, and wherein the control module automatically adjusts a fan speed of the secondary HVAC system when a current temperature of a cabin of the vehicle is sufficiently close to a predefined cabin temperature setpoint.

11. The system of claim 10, wherein the control module automatically reduces a fan speed of the secondary HVAC system when a current temperature of the cabin of the vehicle is sufficiently close to the predefined cabin temperature setpoint.

12. The system of claim 9, wherein the accessory is a secondary HVAC system of the vehicle, and wherein the control module automatically adjusts a fan speed of the secondary HVAC system based on a door status of a door of the vehicle.

13. The system of claim 12, wherein the control module automatically reduces the fan speed of the secondary HVAC system when the door of the vehicle is opened.

14. The system of claim 9, wherein the accessory is a cabin light of the vehicle, and wherein the control module automatically turns off the cabin light based on an operating status of a second accessory that indicates that an occupant of the vehicle is asleep.

15. The system of claim 9, wherein the auxiliary power unit is an electrically powered auxiliary power unit.

16. The system of claim 9, wherein the auxiliary power unit is a prime mover powered auxiliary power unit.

17. The system of claim 9, wherein the accessory is a sunshade of the vehicle, and wherein the control module automatically activates the sunshade of the vehicle to block sun light and heat from entering a cabin of the vehicle.

18. The system of claim 9, wherein the control module automatically reduces an amount of power directed from the auxiliary power unit to the accessory upon determination that the accessory currently is at least one of off and not operating.

19. A method for controlling an accessory powered by an auxiliary power unit of a vehicle, the method comprising:

a control module determining when a primary power source of a vehicle is deactivated;

the control module determining when an auxiliary power unit is activated after deactivation of the primary power source;

the control module automatically controlling the accessory powered by the auxiliary power unit when the control module determines that the primary power source is deactivated and the auxiliary power unit is activated; and the control module automatically reducing an amount of power directed from the auxiliary power unit to the accessory upon determination that the accessory currently is at least one of off and not operating.

* * * * *